США005590991A

United States Patent [19]

Garuglieri

[11] Patent Number: 5,590,991
[45] Date of Patent: Jan. 7, 1997

[54] LOCKING DEVICE

[75] Inventor: Andrea Garuglieri, Colle Brianza, Italy

[73] Assignee: Black & Decker Inc., Newark, Del.

[21] Appl. No.: 338,985

[22] Filed: Nov. 14, 1994

Related U.S. Application Data

[63] Continuation of Ser. No. 111,749, Aug. 25, 1993, abandoned.

[30] Foreign Application Priority Data

Aug. 28, 1992 [GB] United Kingdom ............... 9218366

[51] Int. Cl.[6] .......................... F16B 19/00; F16B 43/00
[52] U.S. Cl. ................................... 411/354; 411/535
[58] Field of Search ....................... 411/354, 535, 411/536, 917; 70/233; 403/374, 409.1

[56] References Cited

U.S. PATENT DOCUMENTS

| 2,234,938 | 3/1941 | Degener . | |
|---|---|---|---|
| 2,430,677 | 11/1947 | Hobart . | |
| 3,561,076 | 2/1971 | Gunther | 411/354 |
| 3,709,088 | 1/1973 | Pitzer | 411/354 |
| 4,614,452 | 9/1986 | Wang . | |
| 4,674,908 | 6/1987 | Kagerer . | |
| 5,022,672 | 6/1991 | Kawai | 411/354 |
| 5,135,330 | 8/1992 | Chen | 403/374 |
| 5,239,906 | 8/1993 | Garuglieri . | |
| 5,249,879 | 10/1993 | Zoor | 403/374 |

FOREIGN PATENT DOCUMENTS

| 0173263 | 3/1986 | European Pat. Off. . | |
|---|---|---|---|
| 924563 | 3/1946 | France | 403/374 |
| 1586785 | 1/1970 | France . | |
| 1784610 | 9/1971 | Germany . | |
| 2943919 | 5/1981 | Germany . | |
| 4106636 | 6/1992 | Germany . | |
| 52-40262 | 3/1977 | Japan | 411/535 |
| 643183 | 12/1947 | United Kingdom . | |

OTHER PUBLICATIONS

European Search Report.
British Search Report.

*Primary Examiner*—Flemming Saether
*Attorney, Agent, or Firm*—Charles E. Yocum; Dennis A. Dearing; Frederick H. Voss

[57] ABSTRACT

A locking device (10) is for locking a first member (12) to a second member (14). The first and second members are mounted on a pivot pin (16) of the locking device. A lever (26) has two cams (25) adjacent the pivot pin (16) between cam followers (22a, 22b) and which retain each cam (25) in position. The lever (26) is movable between a locking position, in which each cam (25) urges the second member (14) towards the first member (12) to prevent relative rotation therebetween, and a release position (FIG. 2) in which the second member (14) is free to rotate about the pivot pin (16) relative to the first member (12). Such a locking device (10) is particularly suitable for use in releasably holding a bevel block (14) against a mounting block (12) of a chop saw or the like.

5 Claims, 1 Drawing Sheet

LOCKING DEVICE

This application is a continuation of continuation application Ser. No. 08/111,749, filed Aug. 25, 1993, now abandoned.

BACKGROUND OF THE INVENTION

This invention relates to locking devices for releasably holding two components together. A device of the sort described herein is particularly suitable for use in releasably holding a bevel block against a mounting block of a chop saw or the like.

Many devices are known for releasably holding two components together. The present invention aims to improve upon such prior art devices by providing a locking device which is simple to manufacture, easy to use and reliable.

SUMMARY OF THE INVENTION

With the foregoing in mind, the present invention provides a locking device for locking a first member to a second member when the first and second members are mounted on a pivot pin of the locking device, the locking device comprising a stop on the pivot pin, a lever providing at least one cam adjacent the pivot pin and a guide for retaining in position the or each cam, wherein the lever is movable between a locking position, in which the or each cam urges the second member towards the first member to prevent relative rotation therebetween, and a release position in which the second member is free to rotate about the pivot pin relative to the first member.

Preferably the stop is a nut on the pivot pin and the pivot pin is threaded to allow the position of the nut on the pin to be altered.

The pivot pin may be a bolt having a head which bears against the first member. Alternatively, the pivot pin may be formed integrally with the first member.

The guide preferably comprises two cam followers mounted on the pivot pin either side of the or each cam, each cam follower providing a groove for receiving a cam. Preferably the grooves are semi-circular, but other shapes may be used depending upon the shapes of the cams.

The guide may be attached to the stop, so that the stop rotates about the pivot pin in response to rotation of the lever.

Preferably a first washer separates the guide from the stop and a second washer separates the guide from the second member.

The or each cam is preferably elliptic in cross-section. Any other appropriate shape could, of course, also be used.

Preferably the lever is formed as a single length of metal terminating at its two ends with cams. The lever is preferably formed triangular in shape, the shortest of the three sides of the triangle being the side incorporating the cams. By having this shape, rotation of the lever about the shortest side of the triangle, to adjust the orientations of the cams, is facilitated.

Although a locking device as hereto described could be used in many different applications, such a device is particularly suitable for use in a saw, such as a chop saw, wherein the first member is a mounting block and the second member is a bevel block. By using the locking device in such an application, an angle for a bevel cut can be readily adjusted and held, simply by moving the lever to its release position, adjusting the angle of the bevel block relative to the mounting block and moving the lever back into its locking position.

BRIEF DESCRIPTION OF THE DRAWINGS

A specific embodiment of the present invention is now described, by way of example only, with reference to the accompanying drawings, in which.

DETAILED DESCRIPTION OF A PREFERRED EMBODIMENT

Figure 1:
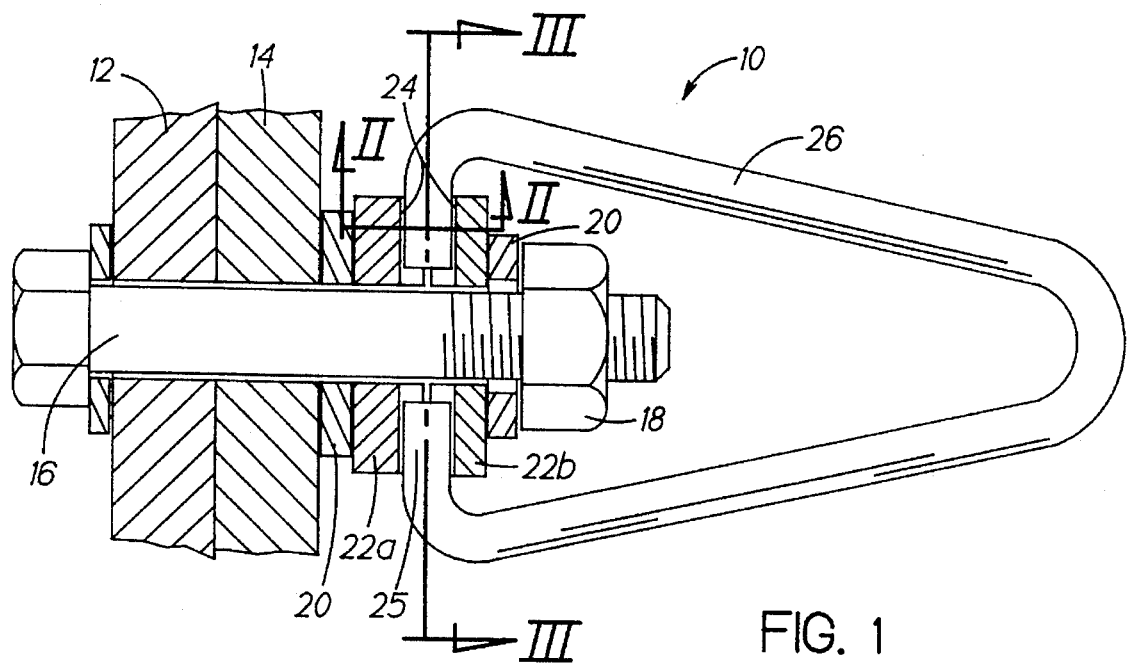
FIG. 1 is a side section through a locking device according to the present invention.

With reference to the drawings, a locking device 10 releasably secures two components 12, 14 together. The device 10 comprises a bolt 16 and a nut 18, which are adjustable using spanners. In an alternative embodiment of the present invention, the bolt 16 may be either formed integrally with the component 12 or captured by some means (not shown) to the component 12.

Two washers 20 and two cam followers 22a,22b are captured between the nut 18 and the second component 14. Each cam follower 22a,22b is washer-like but has facing, semi-circular grooves 24 arranged in a cruciform manner.

Figure 2:
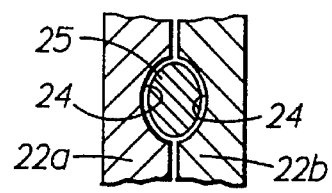
FIG. 2 is a section on the line II—II in FIG. 1.
Figure 3:
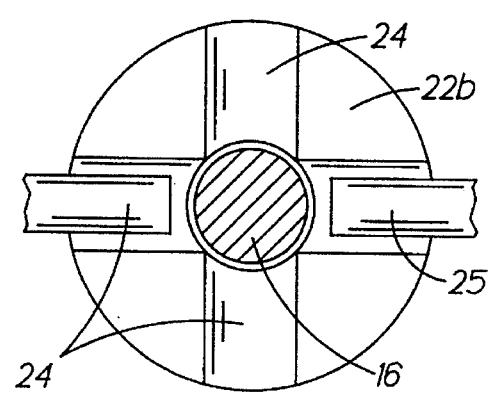
FIG. 3 is a section on the line III—III in FIG. 1.

The grooves 24 of the two cam followers 22a,22b together form a guide for receiving and retaining cams 25, which are formed at the ends of a lever 26. The ends (i.e. the cams 25), at least, of the lever 26 are elliptic in cross-section (see FIG. 2).

In the position shown in FIG. 1, in which the main part of the lever 26 (which is substantially triangular in shape) is in line with the bolt 16, the shortest dimension across the elliptic ends of the lever 26 are between the facing grooves 24. Consequently, the cam followers 22 and washers 20 are loose between the component 14 and the nut 18, thereby enabling the component 14 to rotate about the bolt 16 relative to the other component 12.

When the lever 26 is pivoted around the axis formed by its ends, the longer dimensions across the cams 25 of the lever 26 begin to press against the grooves 24, thereby prising the cam followers 22a,22b apart. In so doing, the components 12,14 are clamped tightly together to prevent relative rotation therebetween. Adjustment of the nut 18 permits a user to select the final position of the lever 26 with respect to the bolt 16 when the components 12,14 are clamped together.

The washers 20 and cam followers 22 are freely rotatable on the bolt 16, so that the direction of pivoting of the lever 26 can be arranged as desired. In another embodiment of the locking device 10, however, the cam followers 22 could be rotationally locked to the nut 18 so that the nut 18 can be turned by turning the lever 26.

The cam followers 22a,22b are formed from slightly softer material than the cams 25 so that the majority of any wear which occurs between the cams and followers on repeated operation of the locking device is primarily felt by the grooves 24. After a time, they may become so worn that the device does function correctly. In this event it is simply a matter of changing the orientation of the followers 22a,22b so that the other pair of grooves 24 is henceforth employed.

It will of course be understood that the present invention has been described above purely by way of example, and that modifications of detail can be made within the scope of the invention.

I claim:

1. A locking device, said locking device comprising:
   a bolt having a longitudinal axis;
   a nut mounted near an end of said bolt;
   first and second components through which said bolt passes;
   a triangular-shaped lever which pivots about and is connected to said bolt;
   two elliptical-shaped cams formed in a base of said triangular-shaped lever;
   two cam followers through which said bolt passes, each located on an opposite side of said elliptical-shaped cams;
   at least one pair of grooves formed in each of said cam followers for mating with said elliptical-shaped cams;
   said lever is pivotable about an axis transverse to the bolt axis such that when said lever is pivoted, said elliptical-shaped cams contact a pair of said grooves and push said cam followers in opposite directions on said bolt, and thereby cause any free space on said bolt to be taken up and further cause said two components to be pressed tightly together and lock.

2. A locking device as claimed in claim 1, further comprising two washers, through which said bolt passes, and located next to said two cam followers, such that one of said washers is located within said triangular-shaped lever between said nut and one of said cam followers.

3. A locking device as claimed in claim 1, wherein said two components are located adjacent to each other.

4. A locking device as claimed in claim 1, further comprising means for adjusting said nut wherein the angle of pivot of said triangular-shaped lever which will lock said components together can be adjusted by the movement of said nut on said bolt which thereby increases or decreases the amount of free space on said bolt.

5. A locking device as claimed in claim 1 further comprising means for rotationally bounding said cam followers to said nut such that rotation of said lever rotates said nut.

* * * * *